May 3, 1960

W. R. HAYNES 2,935,099

SIGNALING FILLER PIPE

Filed March 5, 1958

INVENTOR.
William R. Haynes
BY
Ramsey and Kolisch
Attys.

United States Patent Office 2,935,099
Patented May 3, 1960

2,935,099

SIGNALING FILLER PIPE

William R. Haynes, Portland, Oreg.

Application March 5, 1958, Serial No. 719,444

4 Claims. (Cl. 141—95)

This invention relates to signaling devices for use in filling tanks, and more particularly to a filler pipe adapted to be placed in the filling duct of a tank when filling the tank with liquid, which includes a whistle means indicating the rise of liquid level to a certain height in the tank. Devices of this type are commonly used in filling home and industrial fuel tanks.

The principal object of the invention is to provide an improved device of this description which may be readily and accurately positioned in a tank filling duct to indicate a near-filled liquid level in the tank. The device includes a novel feeler means which contacts and frictionally engages the side walls of a filling duct as the filler pipe is inserted in place, thereby to indicate, when the feeler means is pushed free of the lower end of the filling duct, the position of this lower end. Cooperating with this feeler means is a support adjustable along the length of the filler pipe which may be clamped in fixed position when the end of the filler pipe has been positioned at the requisite depth.

The signaling device includes a feed passage for the delivery of liquid into a tank, and an air whistle passage extending substantially the length of the device through which air escapes from the tank. The whistle passage is connected with a whistle means mounted at the upper end of the device and supported, during use, outside the tank. During the filling of a tank, as the liquid level rises in the tank, air is forced from the tank through the whistle passage and the whistle emits a sound. The sound continues until the inlet end of the whistle passage is covered by liquid, and the flow of air through the passage is stopped.

With such a device, it is important that the inlet end of the whistle passage be positioned in a tank a certain predetermined distance below the base of the filling duct. If the inlet end is not in the tank proper, but instead is located in the filling duct, by the time the level of liquid reaches the inlet end, the tank itself is completely full and the liquid level is rising sharply. Under these conditions an insufficient time delay is afforded after the whistle sound ceases to shut off the delivery of liquid to the tank. If the whistle inlet end is positioned far below the base of the filing duct, the whistle sound stops before the tank is filled sufficiently.

To take care of the above, this invention contemplates a filler pipe having an elongated conduit section forming the main body of the filler pipe, and at least one, preferably two, spring feelers mounted on the bottom end of the conduit section and projecting laterally to the sides thereof. The conduit section has wall portions defining feed and air whistle passages. Portions of the spring feelers are located a short distance above the inlet end of the air whistle passage. The feelers are compressed inwardly within the bore of the conduit section and a laterally inward pressure is exerted thereagainst. The feelers resiliently rub against the inner walls of a filling duct when the filler pipe is inserted downwardly therein, and by the friction, vibration, and noise so produced, signal to an operator the extent to which the conduit section should be lowered in a filling duct in order that the inlet end of the whistle passage be properly positioned below the base of the filling duct. When the springs ride clear of the filling duct walls, the adjustable support which mounts the filler pipe on the filling duct is clamped in place and the filler pipe is ready for use.

The filler pipe of this invention has a number of advantages. The flexible spring feelers occupy little space, and enable the use of a relatively large diameter pipe for the main body of the filler pipe (which speeds up the delivery time required to fill a tank with liquid). The feelers are free from sharp protrusions, which eliminates scratching or damaging of the inner walls of a filling duct. Further, by mounting a portion of one of the feeler springs laterally outwardly from but over or across the whistle passage inlet end, the spring functions as a guard protecting the inlet end from inadvertent damage.

Another feature of the invention is the provision of a nozzle fitting at the top of the filler pipe so constructed that it snugly grips the nozzle end of a liquid delivery hose without leakage occurring around the nozzle and without the nozzle tipping and falling out of place.

These and other objects and advantages are attained by the invention, which is described hereinbelow in conjunction with the accompanying drawings wherein.

Figures 1, 2, 3:
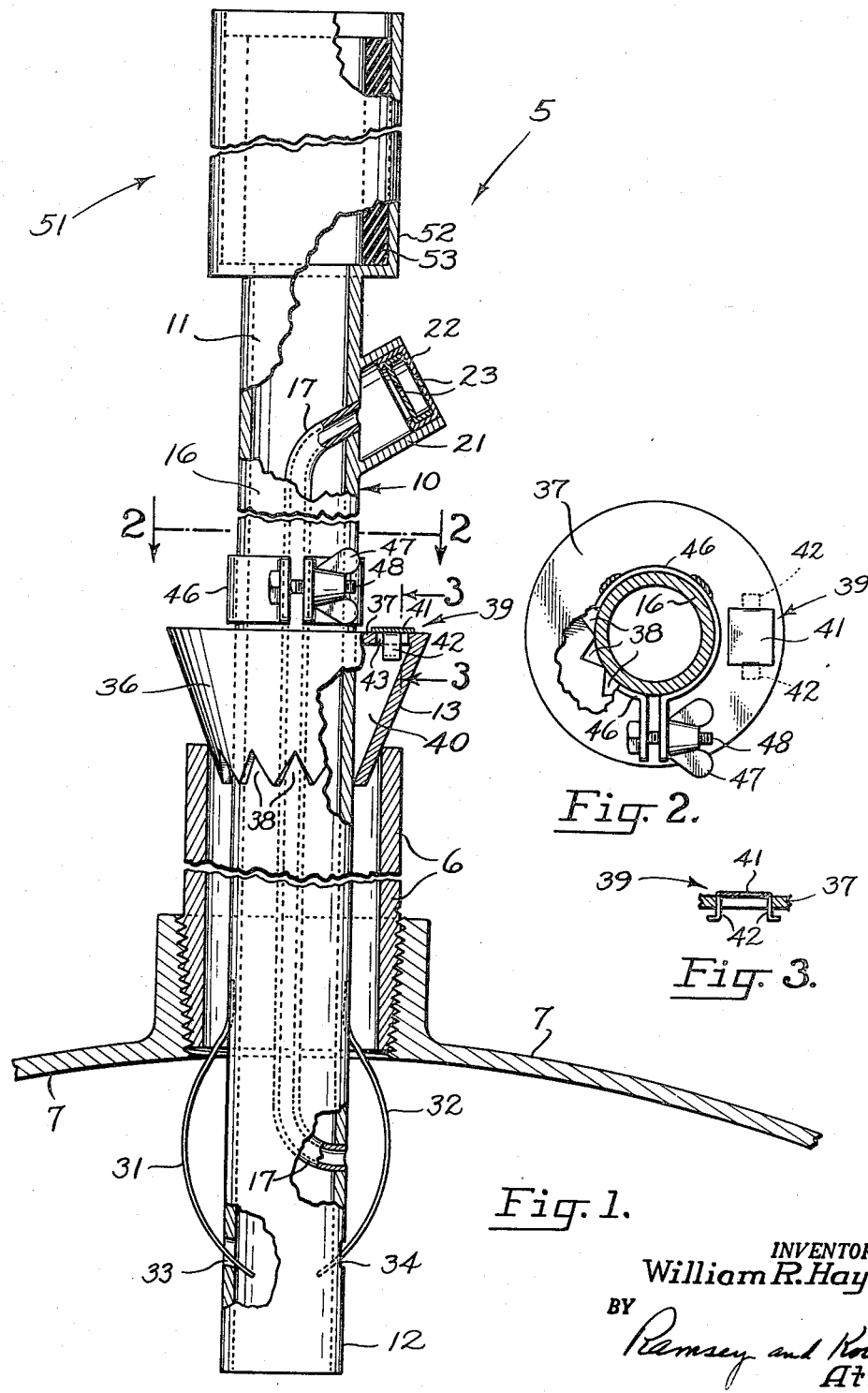
Fig. 1 is a side view of a filler pipe constructed according to an embodiment of the invention, showing the filler pipe mounted in a filling duct of a tank.
Fig. 2 is a section view along the line 2—2 in Fig. 1, illustrating details of the support or stopper present in the device.
Fig. 3 is a section view along the line 3—3 in Fig. 1.

Referring to the drawings, a filler pipe 5 is shown supported in the filling duct 6 of a tank 7. The filler pipe comprises an elongated cylindrical conduit section 10 having top and bottom end portions 11 and 12, and a support or stopper portion 13 slidably encircling the conduit section intermediate its ends. Conduit section 10 comprises an elongated, relatively large outer pipe segment 16, and an elongated tube 17 of substantially smaller diameter mounted within and extending down the hollow interior of pipe segment 16.

The lower end of tube 17 is inserted through an accommodating bore made in the annular wall of pipe segment 16 a short distance upwardly from the base of the pipe segment. This lower end is secured in place as by brazing. The upper end of tube 17 passes through another bore prepared in the upper end of segment 16, where it is similarly secured in place.

Affixed, as by welding, to the exterior of pipe segment 16 over the upper end of tube 17 is a pipe stub 21. The outer end of pipe stub 21 mounts a whistle 22, containing orifices 23. The inner walls of pipe stub 21 form a closed passage between tube 17 and whistle 21. Tube 17, pipe stub 21 and whistle 22 constitute an air whistle passage having an inlet end at the lower end of the cylindrical section and an outlet end at the upper end of the section.

Mounted on the outside of pipe segment 16 at the lower end thereof, and on diametrically opposite sides of the pipe segment, are a pair of elongated curved springs 31 and 32. The upper ends of these springs may seat in small recesses cut into the surface of pipe segment 16, so that the outer surfaces of these upper ends are substantially flush with the surface of pipe 16. These upper ends are secured in place in a suitable manner, as by welding. The springs curve in a continuous sweep first outwardly from the side of pipe segment 16, and then, progressing toward the base of the filler pipe, inwardly toward the sides of pipe segment 16. The lower ends of springs 31, 32 are slidably received and float freely in diagonally disposed passages 33, 34, respectively, made in the walls of the pipe segment. The springs yieldably resist compression forcing the springs towards each other.

It will be noted that upper portions of the springs are spaced above the inlet end of tube 17 and outwardly of the sides of the pipe segment. In this way, during use of the filler pipe, the springs function as feelers and frictionally engage the inner walls of filling duct 6 up until such time as the inlet opening of tube 17 is positioned a short distance below the bottom of the filling duct.

In a preferred embodiment, one of the feeler springs (spring 32 in the embodiment illustrated) is mounted on conduit section 16 so that a portion of the spring intermediate its ends extends across and overlies the inlet of tube 17. In this way the spring also functions as a guard protecting the inlet of tube 17 from damage. The smooth outer surface of pipe segment 16 is broken at the location of the inlet for tube 17, and a guard over this point prevents the filler pipe from hanging up or catching on the ends of a filling duct during use. The guard also shields the brazed connection of tube 17 with pipe segment 16 from damage.

Stopper or support portion 13 is slidably mounted on pipe segment 16, and is thereby adjustable along the length of conduit section 10. The stopper comprises a perforated side wall member 36 shaped as a conico-frustum, and a top wall 37 snugly fitted about pipe 16 and joined at its outer periphery to wall 36. The outer surface of wall 36 provides a tapering seating surface for mounting the filler pipe in filling ducts of varied diameter. Wall 36 is perforated along its base by a series of cutout sections 38. These cutout sections lead into a space 40 within the stopper bounded along its sides by the periphery of the conduit section and the bore of wall 36, and along its top by the bottom surface of wall 37.

A valve member 39, in the form of a small plate 41 having depending L-shaped legs 42, closes an aperture 43 made in top wall 37. Plate 41 is somewhat larger than aperture 43, and the edges of the plate support the plate over the aperture when the valve member is in a lowered position and closing off aperture 43. A predetermined pressure build-up of air under member 39 raises the member so that aperture 43 is opened. Turned over ends of legs 42 strike wall 37 to limit upward movement of the valve.

The valve member, space 40, and cutout sections 38 provide an escape passage for relatively large amounts of air from within a tank. Should the whistle passage become closed, air can escape through this passage before an excessive pressure build-up of air occurs in the tank. An excessive pressure build-up in a tank could cause liquid to spew out of the tank filling duct, and to damage the surroundings.

Stopper 13 also includes a clamp portion 46 affixed as by spot welds to wall 37. Wing nut 47, and screw 48 extending through oppositely disposed end portions of clamp portion 46, are provided for tightening the clamp portion about pipe segment 16.

Secured to the top of conduit section 10 is a nozzle fitting 51. This takes the form of a cylindrical portion 52 axially aligned with pipe segment 16, and an annular cushion 53. Cushion 53, which is made of rubber or similar material, is bonded in place to the inner surface of portion 52. The bore of cushion 53 is proportioned so as slidably to engage the nozzle of a liquid delivery hose inserted therein. The cushion member encircles the nozzle over a substantial portion of its length exercising a substantial constrictive force. The constriction also keeps the nozzle of a delivery hose from tipping to one side, and falling out of the filler pipe.

When the device is used in filling a tank, the stopper or support portion is first moved relatively close to the base or bottom end of the conduit section, after loosening clamp 46 so that the stopper slides relatively freely. The filler pipe may then be inserted into the top end of a filling duct, with its lower end projecting only part way down the duct, and with the stopper resting on the top of the duct and plugging up the same. Springs 31, 32 are compressed inwardly slightly to produce substantial frictional engagement with the bore of the filling duct. The filler pipe is pushed downwardly until the springs 31, 32 are free of the lower end of duct 6 with the springs 31, 32 riding clear of the bore of said duct.

Movement of the springs over the walls of the duct produces some vibration, noise and frictional drag, which is transmitted to and sensed by the operator setting up the device. During this time, the top of the filling duct acts as a support holding the stopper in fixed position as the conduit section is pushed downwardly. When the springs are moved clear of the lower end of the filling duct, the vibration and drag caused by the springs cease, and the operator may then clamp the stopper in place. In the usual instance, the springs are positioned so that the inlet end of the whistle passage is about an inch or so below the bottom of the filling duct, when the springs clear the duct.

The nozzle of a fuel or other delivery hose is then inserted into the nozzle fitting, and liquid discharged into the tank through the interior of pipe segment 16. The bottom of the conduit section extends only a short distance into the tank, to enable liquid to splatter somewhat on leaving the section and in traveling to the base of an empty tank. This splatter tends to prevent sediment which collects on the floor of the tank from being stirred up. As the tank fills, the liquid level rises until it covers the base of pipe section 16. During this time air passes out tube 17, actuating the whistle 22.

At this point, liquid is delivered to the tank from a submerged delivery outlet. On continued infeed of liquid, a quiescent pool of liquid free of foam gathers around the base of the filler pipe. The level of liquid continues to rise until the inlet to tube 17 is covered and the whistle stops.

The spacing of the inlet for tube 17 below the base of the filling duct is selected so that about three to four seconds elapse between the time the whistle stops and the time the tank is completely full. During this interval an operator is afforded sufficient time to shut off the delivery of liquid.

With increased competition, especially in the fuel oil business, it has become quite important that the filling time of a tank be cut to a minimum. Consequently, large capacity pumps and a filler pipe of maximum diameter is desirable. The construction of this invention enables a filler pipe to be used which has an outer dimension substantially equal to that of the inner dimension of a filling duct. The springs need occupy only a small space externally of the conduit section and still function properly.

It should also be noted that the filler pipe may be positioned by inserting it centrally down through a filling duct without tipping the filler pipe. This further results in increasing the maximum diameter permissible in the filler pipe.

The springs at the base of the filler pipe are smooth in shape and cause little wear to the bore of a filling duct. Since they are compressible, the filler pipe may be used with a relatively wide range of filling duct sizes.

It is claimed and desired to secure by Letters Patent:
1. In a sound signaling filler pipe adapted to be placed in the filling duct of a tank, said filler pipe comprising an elongated conduit section having inner wall portions defining a liquid feed passage with an outlet end at the lower end of said section and an air whistle passage with an inlet end at the lower end of said section spaced above said outlet end, said feed and whistle passages having at the upper end of said section inlet and outlet ends, respectively, the improvement comprising a stopper portion encircling said conduit section intermediate its ends and slidably mounted on the conduit section for movement over a portion of the length of the conduit section which is located intermediate its ends, said stopper portion having means for supporting the conduit section on the top of a filling duct, and wall feeler means in fixed position relative to the inlet end of the whistle passage carried at the lower end of said section below the portion of the length of the conduit section over which said stopper portion moves, said wall feeler means comprising spring means projecting externally of the periphery of said conduit section and yieldable laterally inwardly toward the periphery of said section, said spring means resiliently pressing against the inner walls of a filling duct when the lower end of said filler pipe is threaded through a filling duct and being positioned below the base of the filling duct when the filler pipe is in operative position on a filling duct for filling a tank.

2. In a sound signaling filler pipe adapted to be placed in the filling duct of a tank, said filler pipe comprising an elongated conduit section having inner wall portions defining a liquid feed passage with an outlet end at the lower end of said section and an air whistle passage with an inlet end next to but spaced a short distance upwardly from said outlet end, said feed and whistle passages having at the upper end of said section inlet and outlet ends, respectively, the improvement comprising a stopper portion encircling said conduit section intermediate its ends and slidably mounted on the conduit section for movement over a portion of the length of the conduit section which is located intermediate its ends, said stopper portion having means for supporting the conduit section on the top of a filling duct, and at least one elongated feeler spring at the lower end of said conduit section below the portion of the length of the conduit section over which said stopper portion moves and extending longitudinally thereof, said feeler spring curving first outwardly from and then inwardly toward the periphery of said section progressing toward the lower end of the conduit section, said feeler spring having an intermediate portion spanning said inlet end of said whistle passage and spaced outwardly from the periphery of said section.

3. In a sound signaling filler pipe adapted to be placed in the filling duct of a tank, said filler pipe comprising an elongated conduit section having inner wall portions defining a liquid feed passage with an outlet end at the lower end of said section and an air whistle passage with an inlet end next to but spaced a short distance upwardly from said outlet end, said feed and whistle passages having at the upper end of said section inlet and outlet ends, respectively, the improvement comprising a conico-frustum shaped stopper portion encircling said conduit section intermediate its ends and slidably mounted on the conduit section for movement over a portion of the length of the conduit section which is located intermediate its ends, clamp means carried by said stopper portion for securing the same in adjusted positions to said conduit section, and at least one elongated spring extending longitudinally of and secured to said section at the lower end of said section below the portion of the length of the conduit section over which said stopper portion moves, said spring having an upper end spaced above and a lower end spaced below said inlet end of said whistle passage, intermediate portions of said spring spanning and being spaced laterally outwardly from the periphery of said conduit section, said spring being positioned below the base of the filling duct when the filler pipe is in operative position on a filling duct for filling a tank.

4. The sound signaling filler pipe of claim 3 wherein a pair of said elongated springs are secured to the conduit section at the lower end of the conduit section and wherein said springs are mounted on substantially diametrically opposite sides of said conduit section.

References Cited in the file of this patent

UNITED STATES PATENTS

| | | |
|---|---|---|
| 96,833 | Phillips | Nov. 16, 1869 |
| 2,363,424 | Kennan | Nov. 21, 1944 |
| 2,474,806 | Coderre | July 5, 1949 |
| 2,746,415 | Campbell | May 22, 1956 |
| 2,831,452 | Haynes | Apr. 22, 1958 |